United States Patent [19]

Dyke

[11] Patent Number: 5,056,141

[45] Date of Patent: Oct. 8, 1991

[54] METHOD AND APPARATUS FOR THE IDENTIFICATION OF PERSONNEL

[76] Inventor: David W. Dyke, 342 Club View Dr., Great Falls, Va. 22066

[21] Appl. No.: 875,492

[22] Filed: Jun. 18, 1986

[51] Int. Cl.[5] .............................................. H04L 9/32

[52] U.S. Cl. .......................................... 380/25; 380/3; 380/4; 380/23; 235/380; 235/382; 340/825.31; 340/825.34

[58] Field of Search .......................... 178/22.08, 22.09; 235/380, 382; 380/23-25, 28, 3-4, 49, 50; 340/825.34, 825.3, 825.31; 364/200 MS File, 900 MS File

[56] References Cited

U.S. PATENT DOCUMENTS

| | | | |
|---|---|---|---|
| 3,906,460 | 9/1975 | Halpern | 178/22.08 |
| 4,317,957 | 3/1982 | Sendrow | 178/22.08 |
| 4,358,672 | 11/1982 | Hyatt et al. | 235/380 |
| 4,484,067 | 11/1984 | Obrecht | 235/380 |
| 4,528,442 | 7/1985 | Endo | 235/380 |

*Primary Examiner*—Thomas H. Tarcza
*Assistant Examiner*—Bernarr Earl Gregory

[57] ABSTRACT

The present invention is an identification method for use in access control systems using words for both the initial enrollment, and later identification of personnel. Its purpose is to ensure that a person seeking access to restricted areas, financial accounts, benefits and services, is the same person for whom access was originally intended. During enrollment, a prospective user is presented with a wide variety of words called "prompters" which are designed to elicit a consistent "response" word from the user, thus forming a "word-pair." A reinforcement exercise during enrollment results in several "word-pairs" which are most likely to remain in the memory of the user, and are therefore suitable for storage in the memory of an access type device or system maintained by a host organization.

The process may be initiated with a card, key or various other instruments, but user identification is accomplished with an automatic and random selection within the host device of one of the user's prefiled "word-pairs." A user is presented with only a "prompter." His "response" is then compared to that "response" already on file. An exact comparison positively identifies the user. This method is enhanced by using only "word-pair" information which is unique to the user and which is not generally on record elsewhere. By utilizing "word-pair" information which is firmly etched in the memory of a user, and maintained elsewhere only in the memory of a host device, this identification method is less subject to being compromised. Additionally, the user may not even be aware as to which of his own "word-pairs" are stored in the memory of a host device, thereby making it more difficult for a user to willfully compromise this method.

The flexibility inherent in this method is further maximized through use of an identification type card with information so arranged between the card and the access sytem as to facilitate several different security levels for identifying personnel as a function of the number of people to be processed and the processing time available versus the degree of security desired.

5 Claims, 4 Drawing Sheets

METHOD AND APPARATUS FOR THE IDENTIFICATION OF PERSONNEL

BACKGROUND OF THE INVENTION

The present invention relates generally to access systems and the identification of personnel who use them, but more specifically to a method that compares user response words to prefiled words that produce positive user identification.

Fraud by personnel gaining unauthorized access to restricted areas, financial accounts, benefits, and services continues to be a major problem. Hundreds of millions of dollars are stolen, and untold numbers of military and industrial secrets are compromised annually.

A major advancement in combatting such fraud would be to devise a method to positively identify a person seeking access in the above areas as being the same person for whom the access privileges were originally intended.

Identification of personnel has traditionally rested on meeting one or more of the following criteria:

(1) who they are (a photo, biometric print, etc.);

(2) what they know (personal identification number, code, etc.);

(3) something they have (a card, key, etc.)

Devices developed thus far to identify and/or control the access of personnel can be put into two general groups.

One group consists of high tech biometric type devices which address the first of the aforementioned criteria as to who they are. These devices measure such things as signature dynamics, retinal patterns, finger, hand and voice prints. Due to certain differences in follow-on measurements, an error window must be established for each type of device. If the error window is too small, a user with a temporary, but justifiable variation may be rejected. If the error window is too large, however, an unauthorized person may be inadvertently granted access.

The second group consists of non-biometric type devices which deal with the user criteria of what they know and something they have. In either case the systems involved can generally be compromised because something they have can be confiscated; and what they are required to know is usually an abstract number, or code that is subject to being forgotten. Such numbers or codes are therefore usually written down in a place convenient to both the user and, inadvertently, to someone intent on fraud.

Thus, previous efforts to positively identify personnel have failed for the following reasons:

(1) The error windows in biometric devices cannot be sized perfectly concerning a user and who they are.

(2) The requirement to know abstract numbers or codes usually results in their being written down someplace where they are too easily compromised.

(3) The link between a user and something they have is too weak since nearly anyone could use a card or key.

The present invention solves the aforementioned problems by (1) drawing a profile of users as to who they are that is likely to remain constant over a long period of time; (2) by utilizing only tangible information in the form of words, which are unique to the user and tend to remain firmly etched in their memory in representing what they know; and (3) developing the strongest possible link between users and something they have.

These tasks are accomplished by the present invention with cost effectiveness and relative simplicity, while addressing simultaneously all three of the identification criteria listed above.

SUMMARY OF THE INVENTION

The present invention consists of three parts. They are the enrollment method, the identification method, and the membership/identification card.

Collectively, these three parts form an identification system, which, unlike any other system, addresses all three user criteria as to who they are, what they know, and what they have.

The enrollment method, because of the uniqueness of user "word-pair" information and the manner in which it is derived, addresses the user criteria as to who they are.

The user identification method will re-use the information produced during the enrollment method for the positive identification of personnel and address the user criteria of what they know.

The membership card, will serve as the user criteria of what they have, and will be organized to provide a multi-level flexibility which can be adjusted to suit the number of users being processed, the processing time available, and the security level desired.

An object of the invention is to provide an identification system for personnel that is relatively simple and requires no memorization of abstract codes.

Another object of the invention is to provide an identification system for personnel that can use stationary devices in network operations, or small, self-contained devices for both stand-alone and portable operations.

Another object of the invention is to provide an identification system for personnel with a "zero error" window and no intimate user/device contact.

Another object of this invention is to provide an identification system for personnel that is cost-effective, yet highly secure, with little prospect of being compromised.

Another object of the invention is to provide an identification system for personnel that may be adapted to complement current systems.

Another object of the invention is to provide an identification system for personnel that utilizes a paperless user enrollment, from remote sites if necessary, whereby there is no record of "word-pairs" outside a particular security environment.

Another object of the invention is to incorporate the user enrollment information and the identification method into a membership card in such a way that a multi-level flexibility is provided by the overall system which can be adjusted to suit the number of users being processed, the processing time available, and the security level desired.

These and other objectives are met by using an enrollment method to develop "word-pairs" or "prompters" and "responses" that are unique to the user; and identification method which establishes the link between a card or key and its owner; and a membership card which can be used to achieve various levels of security.

This invention recognizes that the memory of abstract code numbers is one of the most difficult of all memory chores. That is the reason for most users writing their codes down in some convenient place, and the reason for these codes being easily compromised. The enrollment method therefore utilizes information that is tangible and meaningful to the user. It encourages the use of unusual, vivid words resulting from user sensory perceptions and his past experiences. These same words are then used in conjunction with a word association program by which the memory is further strengthened, since the link system is the most basic of all memory systems.

Further, the enrollment method provides an active procesing method for the user. This is done by presenting a list of about 80 or so "prompters" from which the user selects, or inserts a designated number of "prompters" for his own use, such as six or eight, depending on the nature of the group he represents. The user then enters his "response" to his selected "prompters" electronically into the system. By ingraining the resultant "word-pairs" in the user's mind through repetitive exercises and an effective testing session; and by providing the "prompter" as the retrieval cue in drawing out a users "response," information is better retained and retrieved. Thus, the "word-pairs" serving as entry codes for a user need not be written down anywhere.

A most important element in this enrollment method is the formation and utilization of "word-pair" information unique to a user which tends to remain firmly resident in the memory of that user. Prompting the user with only the first word of a "word-pair" will then result in a reliable, consistent "response" that can be compared with a "response" already on file in order to positively identify a user.

In the present invention, a "prompter" and "response" form a "word-pair" that represents a bit of information which is not written down outside the security or access system's environment, but is strongly embedded in the user's memory to the extent that exactly the same "response" can be counted on time after time. As to just what the "response" is and whether it is spelled right or wrong makes no difference at all so long as it is the same response to that particular "prompter" each time. In fact, the less sense that a "response" makes to anyone else only increases the security aspect of the code.

The identification method in this system draws on a multiplicity of "prompters" and "responses" on file for a particular user; such that a random word generator in an interrogation device would randomly select only one "word-pair" and the user could never be sure which "word-pair" he would be tested on next. The net result would be the equivalent of having a variety of personal identification codes in a form that none of them would have to be written down, and each of which would be useable at unpredictable times.

The displays of a user's "prompter" and his "response" would be done in such a fashion that it would be difficult for someone else to observe and combine another user's "prompter" and "response" in order to defraud an access system. Also, an unauthorized user would have to know all the "word-pairs" in a user's file before he could be assured of gaining access.

A highly unique option using this "word-pair" method is readily available through drawing from the user during the enrollment process a plurality of "word-pairs" from which a security officer or device would then select the "word-pairs" for use in a user's file, without the user being advised as to which "word-pairs" were selected. Since the user couldn't be certain just which "word-pairs" were in his own file, that user's complete file of "word-pairs" could not be extracted from him, nor could he sell his own file or even give it away.

Moreover, with a suspected breach of security, a user's file of "word-pairs" could be easily changed on the basis of the most current enrollment information without the user's knowledge of such a change, or a degradation in his use of the system.

The membership/identification card is organized to accommodate users at various processing speeds in consideration of the number of users to be processed and the security level desired.

The lowest level of security in this system, when dealing with a large number of users and minimum processing time, could be satisfied by simply using the card with an identifying picture of the user covering the majority of one side of the card.

A moderate level of security would be achieved by a card reader checking for member number, effective date and/or expiration date, and comparing them with system information for validity. A check of the time could also be done in the same manner for those personnel who are authorized to work a particular shift.

A higher level of security would involve use of the "word-pairs" unique to a particular user. After completing the earlier checks for a valid membership number, dates or times; one of the user's "word-pairs" would be randomly selected and a "prompter" presented to the user. The users "response" would then be entered and compared within the system with that "response" already on file. An exact comparison would then grant the user access to the system.

The highest level of security could be achieved by having a user respond to a second or third "prompter" in his file. Also, "word-pairs" for a particular user could be changed from time to time on the basis of the volume and quality of information available in a user's enrollment file, such that a user could never be sure just which "word-pairs" were active in the access system. Under these conditions, since a user could not know exactly what was in his file, he could not willfully disclose that information nor could the information be extracted from him.

Thus, the present invention provides for an access system with (1) an enrollment method that produces information unique to the user as to who they are; (2) an identification method of what they know which establishes the link between a user and the card, key, or document he bears; and (3) an identification card with user information arranged in such a fashion between the access system and the card that the system is capable of several levels of security and processing times while satisfying the identification criteria of what they have.

The objects of my invention and the relationship of its elements will be better understood by referring to the following drawings, description and examples.

DETAILED DESCRIPTION OF THE DRAWINGS

The present invention can best be understood by referring to examples and drawings provided herein.

In general, the paperless enrollment method produces a small file of enrollment data which is entered directly into the system which the user hopes to access. The identification method then compares that enrollment data with user and system inputs at later dates in order to verify user identification and grant access. The membership card is designed to complement the enrollment data and system components in various arrangements so as to provide several different levels of checking personnel, in consideration of the number of users to be processed and the time available versus the level of security desired.

The enrollment method provides a source of data which is incorporated into the memory of an access system. The enrollment method could be effected manually, but the preferred embodiment entails the use of a personal computer (PC) and program, while the access system would use a mainframe type computer and another program to manage the overall system. Virtually any number of PC's with screen displays, central processing units (CPU), and memory could develop and supply the enrollment data in a networking arrangement.

Figure 1:
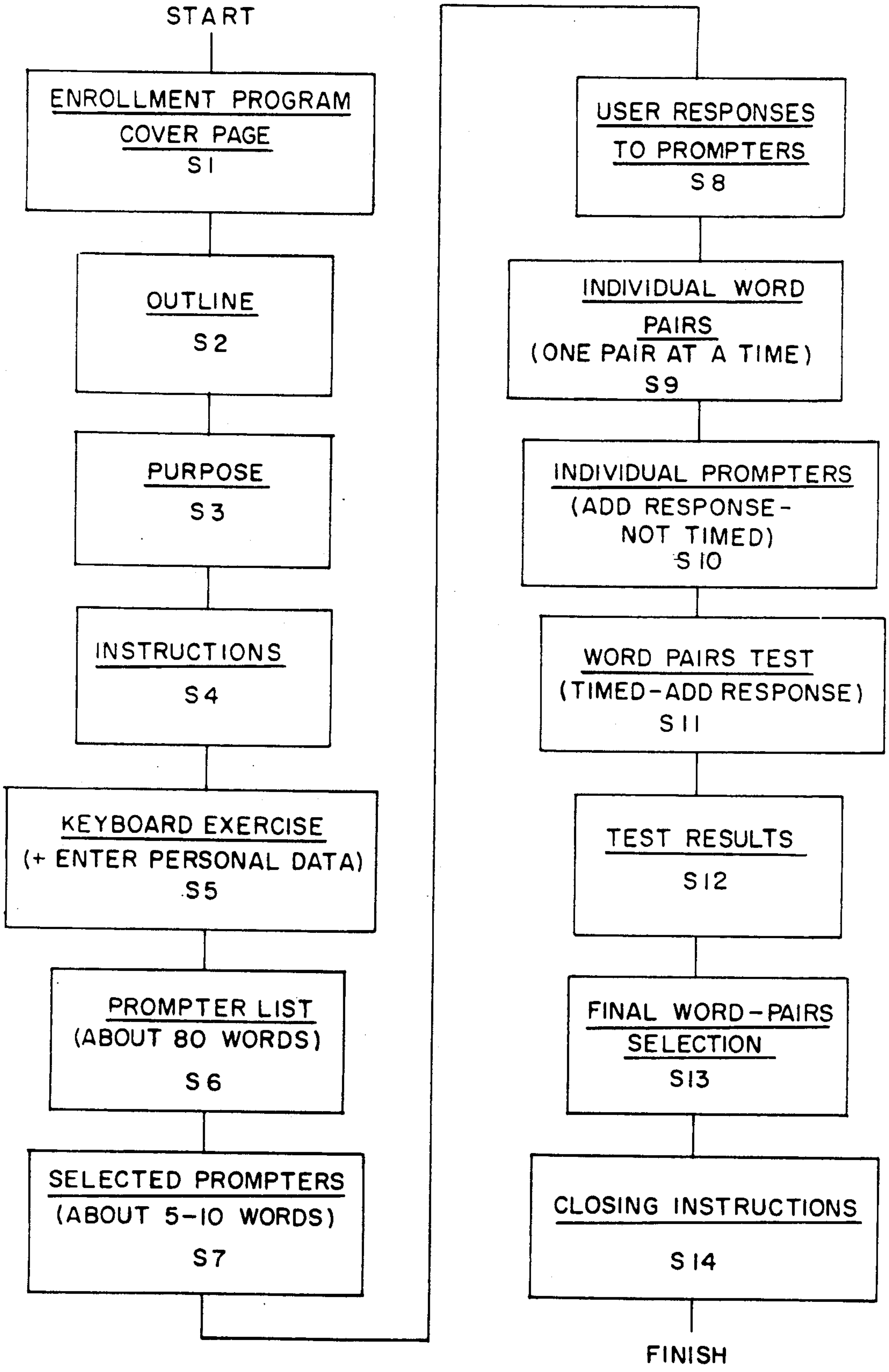
FIG. 1 is a 14 step example of the user "Enrollment Program" which is designed to produce a file of enrollment data about each user for storage in the memory of the access system.

The enrollment method includes a program recorded on a floppy disc or other type memory device which is outlined by the 14 steps shown in FIG. 1, and is accomplished at a work station, which is preferably located within the environment of the access system, but may also be located at remote sites. The program is designed to lead a user through the enrollment steps without assistance, thereby protecting the security aspect of the user's enrollment data.

The enrollment method begins with the introductory information displayed on the screen of the enrollment PC in order for the enrollee to understand the basics of the enrollment process. The first step (S1), shown in FIG. 1, is therefore, a cover page indicating enrollment in whatever system it is that the user hopes to gain access to. After the cover page the enrollee is provided an outline S2 of the program which is the same as the headings on the successive steps S3 titled purpose and through S14 closing instructions respectively. Each sequential step represents information displayed on the screen of the PC terminal.

Following a statement as to purpose S3 of the enrollment program, additional instructions are provided in steps S4 and S5.

In step S4, the enrollee is given general instructions as to what to do and what not to do in selecting "prompters" and providing "responses" in forming "word-pairs."

Step S5 provides a keyboard exercise, in which the enrollee be given exercises to acquaint him with the keyboard operations and cursor movements which allow the enrollee to make entries, via the keyboard, that can be displayed on the screen and later entered into the access system.

The keyboard exercise also obtains such information as user name, title, department, I.D. number and effective dates, which will be combined with the "word-pair" information obtained later in the program. Collectively, this information constitutes the user's enrollment data.

The heart of the enrollment program begins with the display of a "prompter" list (S6). The user is directed to select a predetermined number of "prompters" from the list of about 80 presented or insert his own, whichever are more meaningful to the user. Also, the list of "prompters" may be adjusted to suit the nature of the user community so that there would be something for everyone.

By way of example, the following "prompters" may be displayed on the screen a step S-6 of the block diagram shown as FIG. 1.

| Animal | Area | Body | Business |
|---|---|---|---|
| bird<br>cat<br>dog<br>pet | city<br>country<br>island<br>state | cry<br>laugh<br>drink<br>eat<br>sleep<br>think | corporation<br>restaurant<br>service<br>store |
| **Career** | **Entertain** | **Gem** | **Hobby** |
| chore<br>job<br>profession<br>vocation<br>work | book<br>cartoon<br>celebrity<br>magazine<br>movie<br>newspaper | jewel<br>mineral<br>rock<br>stone | antique<br>club<br>music<br>tools<br>travel |
| **Home** | **Plants** | **Relative** | **School** |
| appliance<br>car<br>furnishings<br>room<br>toys | flower<br>fruit<br>tree<br>vegetable | aunt<br>uncle<br>boy<br>girl<br>baby | college<br>grade |
| **Senses** | **Sports** | **Your Choice** | |
| hear<br>feel<br>see<br>smell<br>touch | exercise<br>game<br>players<br>team | | |

The enrollee, by moving a cursor, or by other means, can select a predetermined number of "prompters," depending on the nature of the enrollee class and the program produced for it. For instance, where large numbers of enrollees are to be enrolled, the number of "prompters" may have to be limited to limit the amount of stored data. On the other hand, if a higher level of security is required, and fewer users are involved, a greater number of "prompters" can be selected. The number of "prompters" may also be limited or enlarged depending on the group's level of intelligence, age, or educational backgrounds of the enrollee class. Higher levels of intelligence or education would allow a higher number of "prompters" to be selected, and more "word-pairs" formed.

From S4, the enrollee would have been instructed to choose "prompters" that would elicit strong and consistent "responses," as will be explained in greater detail.

After a user picks out those "prompters" which are meaningful to him, or inserts his own, the others are eliminated and the user is left with his own list in step S7. A user enters his own "responses" to those "prompters" in step S8 by means of the keyboard. These "responses" are words provided by the user through his highly personal word associations with his selected "prompters".

Now that a user's "word-pairs" are formed, a reinforcement exercise takes place. First, the user's "word-pairs" are repeated—one pair at a time—during which time the user repeats both words silently to himself (S9). Then, just his "prompters" are repeated, each being displayed on the screen, with the user filling in his required "responses" (S10). Finally, a test is given and the element of time is introduced. In step S11, the cycle of display the "prompter" and enter the "response" for each "word-pair" is repeated four times in a three minute period, for example. The test results are displayed in S12, such as by displaying the "word-pair" and the number of correctly entered "responses" to each displayed "prompter". The strongest "word-pairs" are selected based on the highest scores and entered either automatically or by a security officer, into the user file in S13. The final "word-pairs" constitute the "word-pair" portion of the enrollment data. The closing instructions in step S14 terminate the enrollment program. The end result of the program is to produce a small file of enrollment data, such as that shown by the following example, for storage in the mainframe memory of an access system for later use in the identification method.

ENROLLMENT DATA

| | |
|---|---|
| A. Personal Data | |
| 1. First Name | John |
| 2. Last Name | Jones |
| 3. Title | Sailor |
| 4. I.D. Number | 1234567 |
| 5. Effective Date (or time) | yy/mm/dd (24 hour clock) |
| 6. Expiration Date (or time) | yy/mm/dd (24 hour clock) |
| B. Word-Pair Data | |
| Prompter No. 1 | pet |
| Response No. 1 | Bulldog |
| Prompter No. 2 | country |
| Response No. 2 | Switzerland |
| Prompter No. 3 | college |
| Response No. 3 | USNA |
| Prompter No. 4 | Uncle |
| Response No. 4 | Sam |
| Prompter No. 5 | Julie |
| Response No. 5 | Kookamonia |

The identification method would generally be processed by the same mainframe computer used to manage the access system. However, it could also be handled by programmable hand-held microcomputers, that are equipped with card readers of various kinds which can scan data written in coded form on identification cards and process it. It is within the scope of this invention, therefore, to provide apparatus necessary to effect the identifiction method.

Figure 2:
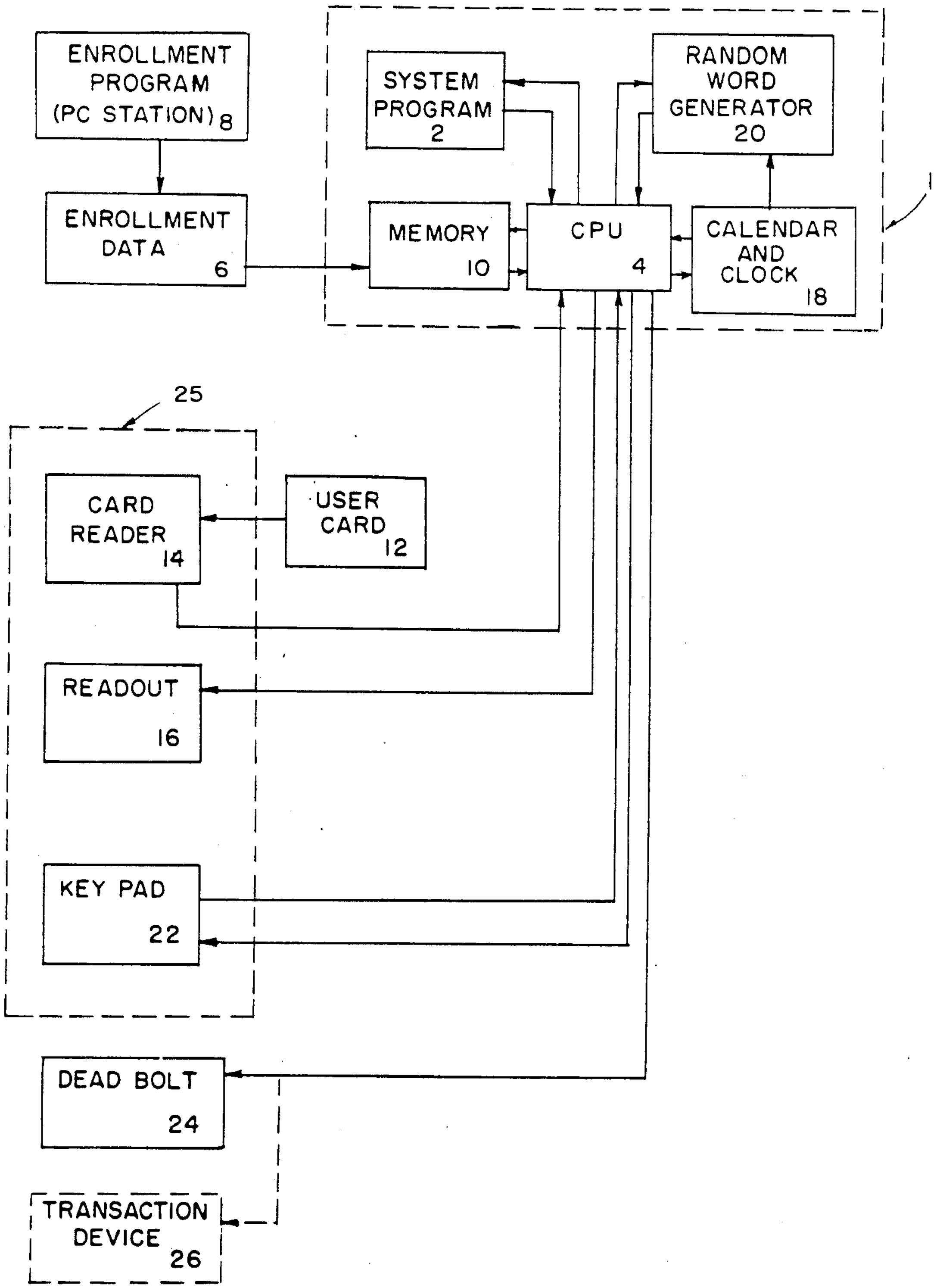
FIG. 2 is a schematic representation of one embodiment of the identification system showing the relationship and various inputs to a central computer in a fixed, network type installation.

The identification method description re-uses the enrollment data. It is most important that the user's "prompters" and "responses" remain completely within the access system. The other enrollment data regarding name, title, I.D. number, and dates or times may appear on the membership/I.D. card, or remain resident within the access system along with the "word-pairs", according to the desires of the host organization. For example, an abbreviation of this identification method could be used at the entrance to restricted plants or sites for purposes of validating the daily reissue of ID cards to the correct worker, through simply requiring a proper "response" to a "prompter". A preferred embodiment of the identification method and apparatus is shown in FIG. 2.

The invention includes an access system computer 1 which includes a system program 2, as may be recorded on hard or floppy discs or other recorder means. The program 2 operates or directs the CPU 4 to retrieve user enrollment data 6 previously generated by the enrollment program 8 and loaded into system computer memory 10 in response to a membership/I.D. number being read from a user's card 12 by card reader 14. The card reader communicates the number to the computer 1 in order to initiate the retrieval of enrollment data by the CPU 4.

The card reader may be any suitable card reader means, and may be a part of the computer 1 but more generally will be remotely located and interconnected through a conductive cable.

If the enrollment data for a particular I.D. number is not in memory, the program directs the CPU to send a message to optical or audio readout 16 to indicate "invalid card," whereby access is denied the card holder. Readout 16 is preferably part of the card reader, and may therefore also be a part of or connected to the computer.

If the enrollment data is in the memory, a comparison is made between the system calendar and clock 18 and the personal data portion of the enrollment data as to effective date (or time). If the comparison reveals that the system date (or time) does not fall between the effective and expiration dates (or times) established for the user, a visual or audio readout will appear at readout 16 indicating "invalid date" or "wrong hours," or similar language, and again access is denied the user. If all checks to this point were correct, the random "word-pair" generator 20 in the system would select one of the user's "word-pairs," and only the "prompter" of the "word-pair" would be presented directly to the user by readout 16. The "response" would be entered by the user by means of keypad 22. The entered "response" would then be compared with the stored "response" in the computer for a match. That match of the enrollment data "response" with the user's "response" would then grant the user access to the system, and readout 16 would so indicate, such as by "passed OK" with optionally corresponding action, such as opening a dead-bolt 24.

In an automatic teller machine, a match could lead to activation of the transactional portion of the access system 26. An incorrect "response" comparison would produce a readout of "wrong answer" and resulting access being withheld from the user. Additional retries for the user are predetermined at the option of the access system host and written into the system program.

In one application of the invention, the card reader 14, readout 16 and keypad 22, are wired directly to the access computer 1, with the computer 1 being in a central, secure location, such as a security office, and the elements 14, 16 and 22 being located at a remote site. These elements could also be combined to form a single remote access device 25 mounted at an entrance or at a guard post as a fixed installation, with a network of such devices. In the case of a transactional identification, the device 25 could be located at cash registers, and devices 25 and 26 located with automatic teller machines.

Figure 3:
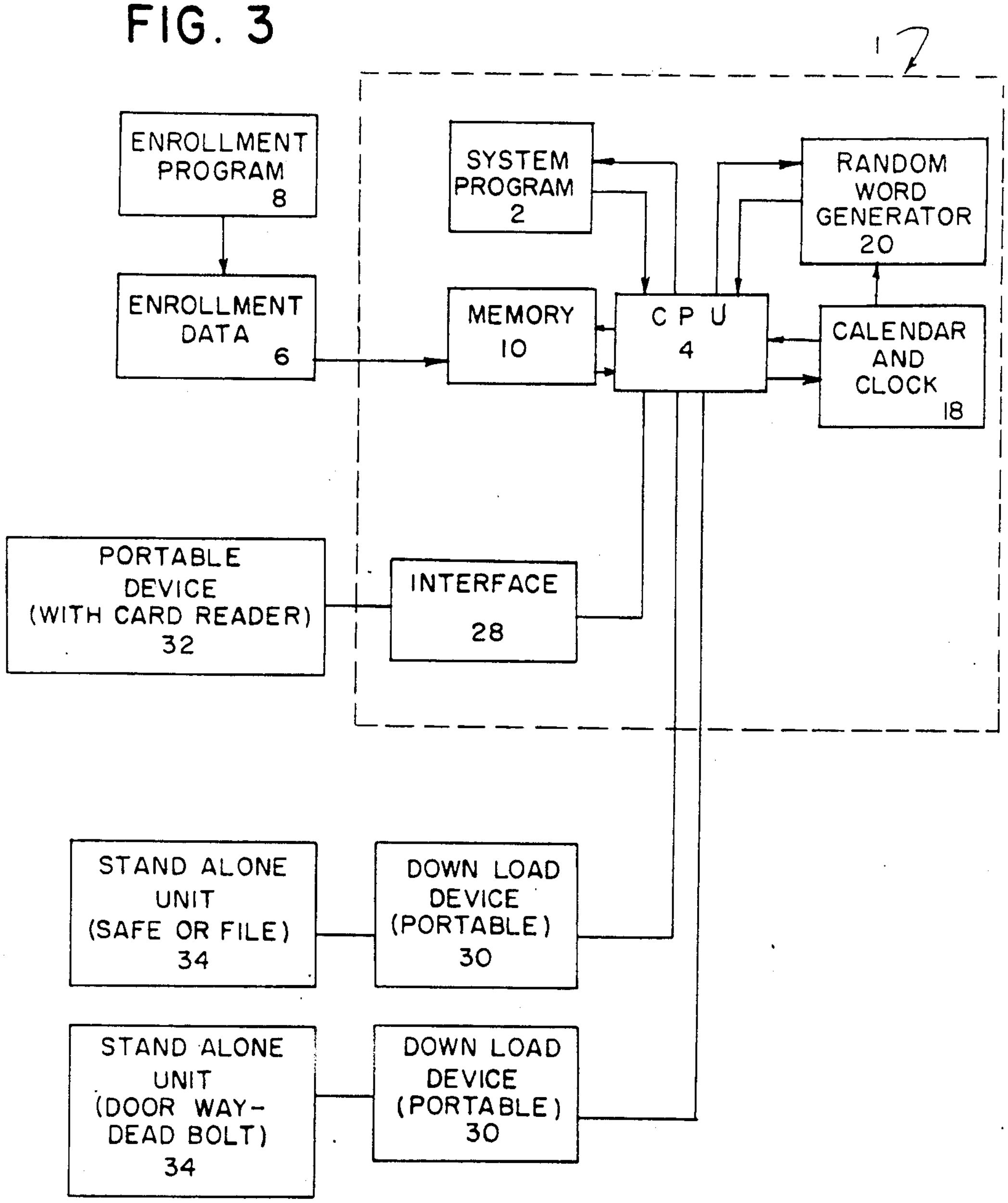
FIG. 3 is a schematic representation of another embodiment of the invention showing the relationship and various inputs between a central computer and portable or stand-alone units.

In another embodiment, as shown in FIG. 3, all, or selected parts of the system's main memory user enrollment data file may be transferred through interface units 28 as a part of computer 1 into portable devices 32 to provide a roving security capability. The portable devices would be self-powered and equipped with card readers, memory, data entry keys, and processing means. The card readers and portable devices 32 utilized in this system could use cards of virtually any type—bar code, magnetic strip, magnetic dot, Weigand, microchip or proximity. Portable units are intended to provide a security capability at remote sites, or to patrol an area, such as an assembly linewhere a tie into power or telephone lines would be impractical. The stand-alone units 34 may be associated with doorways, safes and file cabinets and may be connected to locks or doorway dead-bolts. Stand-alone units obtain their information through portable down-load devices 30. In either case, the portable and stand-alone units can operate independently without the use of electrical power or telephone lines. Portable units 32 need to be returned periodically for recharging batteries and for updating user enrollment data files, while stand-alone units 34 would have the batteries replaced on site and their data files updated with the protable download devices 30. Two additional security measures are available for the portable and stand-alone units which may be outside the more secure environment of the access system. The portable units may be provided with a code word which would have to be entered by the guard at specific times to prevent loss of memory in the device. Also, a code word could be inserted in both portable and stand-alone units to indicate whether the memory of the devices had been tampered with. The internal operation of fixed installation, portable and stand-alone components of the access systems in FIGS. 2 and 3 is best shown by referring to FIG. 4 which represents the stored program for all three types of operations.

Figure 4:
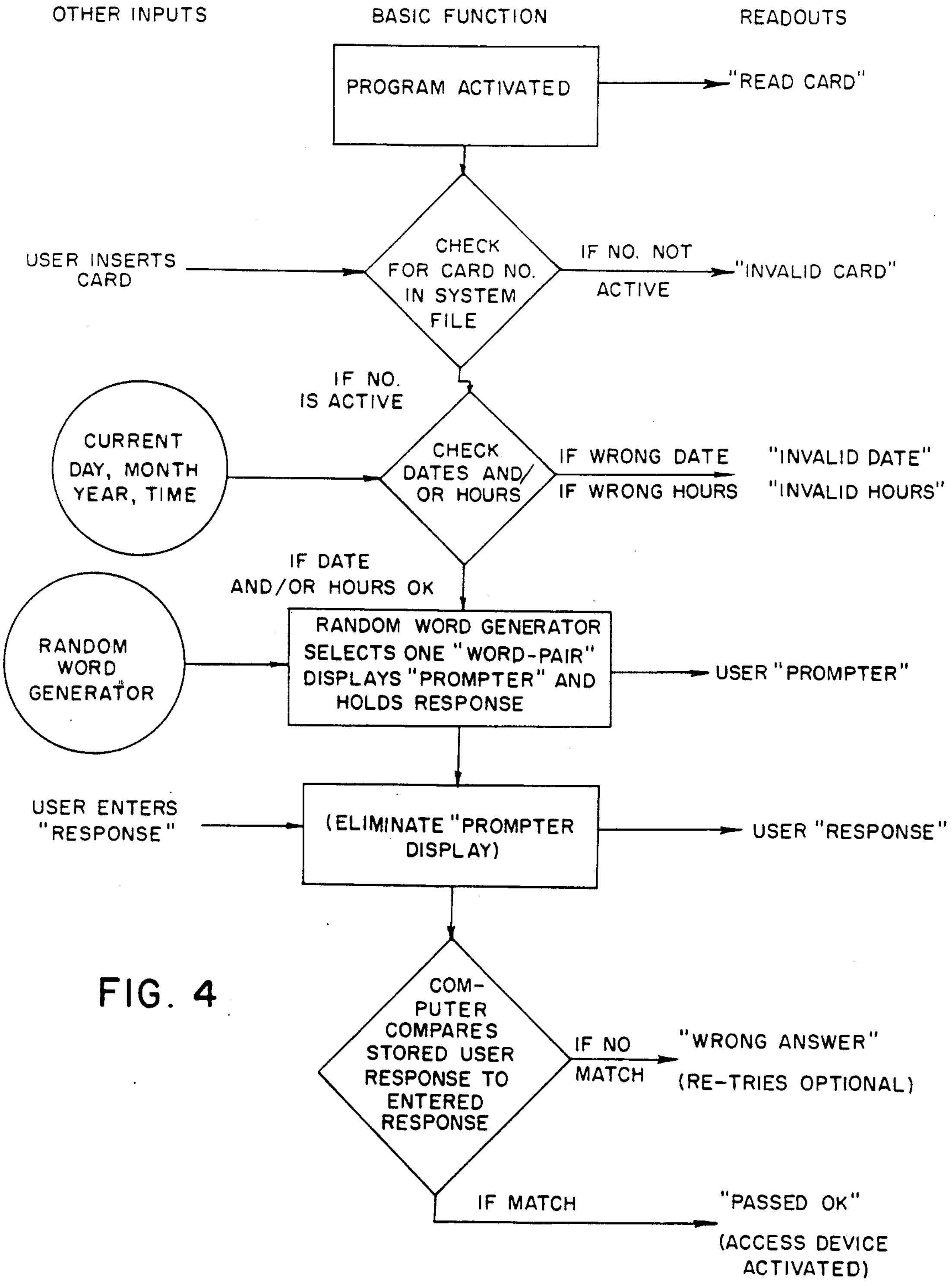
FIG. 4 is a Program Flow Chart as to how user enrollment data is processed by the fixed installation, portable and stand-alone units alike.

The program flow chart FIG. 4 shows that after reading a user's card, the first automatic check is to see if that user I.D. number is indeed an active member of the organization. If not, the readout indicates "invalid card." If the user is in the active file, the next automatic check is for effective date, expiration date, or work shift hours, depending on the nature of the host organization and their concerns. If one of those items is wrong, either an "invalid date" or "wrong hours" could appear on the card reader's readout. If the checks are all OK, then one of the user's "word-pairs" is randomly selected from the user's file. The "prompter" is presented on a readout to the user, and the "response" is saved for comparison with the user's "response." An incorrect comparison will produce on the readout a "wrong answer." The program at this point may be adjusted to produce additional tries by the user if the host organization so desires. A correct comparison produces a readout of "passed OK," with a corresponding action by the access system, such as opening a dead-bolt for access to a space, or granting access to continue a financial transaction, as with automatic bank tellers, check authorizing networks, or credit cards.

Lastly, the membership/I.D. card is a rather simple, but important element in the access system described herein. Only one side of the card is of concern in this invention. The other side is intended for use by either the host organization, or the security company that builds the access system.

Figure 5:
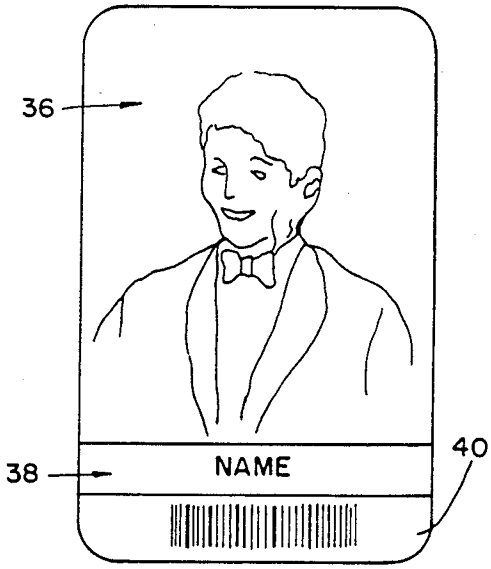
FIG. 5 is a representative membership/I.D. card which facilitates a multi-level security capability.

The suggested card format is shown in FIG. 5. Approximately 70 percent or more of the card's surface is devoted to a photograph 36 of the user. Several additional recognition features are gained by angling the user away from the conventional frontal view just enough to pick up the additional recognition features ranging from the top of the ear down through the lobe, jaw, neck and Adam's apple. The objective is to maximize the number of recognition points regarding a user, given the limited amount of area available on the card. This feature will satisfy the lowest level of security in which there is a large group of users to process, with only minimal processing time available. The user's name 38 could be either printed or in signature form for checking against other documents, if necessary.

For the next three higher levels of security, the data line on the card would be read by some sort of device. As discussed earlier, any of the six basic card types can be used for this purpose, with, of course, a reader suited to that particular type card.

For a moderate level of security, a reader could check for an active I.D. number at 40 as a minimal requirement, with or without such optional items as effective date, expiration date, or work shift hours authorized.

A high level of security could be achieved by requiring the user to process a single "word-pair." The processing time is increased significantly, however, and this procedure is thereby suited to a small user group size.

The highest level of security can be achieved by either requiring that a user process a "word-pair" from a file that is continually changing or a file in which the user is not told which of his "word-pairs" have been enrolled. Another technique for achieving the highest level of security would be to require a user to process two or more of his "word-pairs."

The following summarizes the varying security levels obtainable by using the methods and apparatus of the present invention.

| Desired Level | Card Elements | User Group Size | Process Time |
|---|---|---|---|
| low | picture only | large | faster |
| moderate | member # dates/times | medium | fast |
| high | single "word-pair" | small | slow |
| highest | single "word-pair" (unknown file) | select | slow |
| | multiple "word-pairs" (known or unknown file) | select | slower |

I claim:

1. A system for identifying individual users for granting access comprising, enrolling means for enrolling a user in a system, the enrolling means further comprising display means for displaying an enrollment outline, purpose and instructions, a keyboard inputting means for inputting information, means for acquainting a user with a keyboard, means for obtaining information about the user, a prompter list display means for displaying a list of prompter words, prompter word selection means for selecting with the keyboard certain of the displayed prompter words selected by the user, prompter word inserting means for inserting additional prompter words selected by the user, means for presenting prompter words selected by the user, and means for accepting user generated response words in response to the user selected prompter words, means for recording prompter words and user generated response words which become required response words as word pairs, means for reinforcing word-pair associations including means for presenting word-pairs, one pair at a time and means for presenting selected prompter words and means for the user filling in required response words, means for testing validity of word pairs by presenting selected prompter words and accepting user generated response words from the keyboard and comparing the user generated response word with the previously recorded response word, means for timing the inputting of response words in reactions to prompter words, and means for selecting the strongest word pairs of prompter and response words, storage means comprising means for storing user identification and selected word pairs, and random selection means for randomly selecting single prompter and response word pairs from the storage means, user identifying means for identifying a person as the particular user for which information is stored in the storage means comprising input means for inputting user identification, display means for displaying a prompter word from a word-pair selected by the random selecting means from the group of preselected word-pairs related to the particular user stored in the storage means, and alpha inputting means for inputting a response word by the person to be identified, matching means for matching the user generated response word with the response word from the randomly selected word pair in the storage means, and action means associated with the identifying means for permitting access when the user generated response matches the response in the storage means.

2. A method for identifying individual users for granting access comprising, enrolling a user in a system, the enrolling further comprising displaying an enrollment outline, purpose and instructions, performing keyboard exercises, inputting information with a keyboard, instructing in keyboard use, accepting keyboard inputs, and displaying a list of prompter words for selecting with the keyboard certain of the displayed prompter words, accepting from the user additional prompter words, presenting prompter words selected by the user, and accepting user generated words in response to prompter words, recording prompter words and user generated response words as word pairs, reinforcing word-pair association, including presenting word-pairs, one at a time, presenting selected prompter words and receiving response words, testing validity of word pairs by presenting selected prompter words and accepting user generated response words from the keyboard and comparing the response words with the previously recorded response words, timing the inputting of response words in reactions to prompter words, and selecting the strongest word pairs of prompter and response words, storing user identification and selected word pairs and identifying a person as the particular user for which information is stored in storage comprising inputting user identification, randomly selecting single prompter and response word pairs from storage, displaying a prompter word from a word pair selected by random selection from the group of preselected word pairs related to the particular user stored in storage and inputting a response word by the person to be identified, matching the user generated response word with the response word from the randomly selected word pair in storage and permitting access when the user generated response matches the response word in storage.

3. A method of positively identifying users for the purpose of granting access comprising, storing in a computer basic identification data about individual users, forming individual user word-pairs on the basis of user generated word association, each word-pair comprising a prompter word and a user generated response word, testing user generated response words to prompter words, selecting word pairs according to consistency and time of response, storing selected word-pairs in data file means, wherein the word-pairs and basic information data comprise enrollment data for enrollment of individual users, entering basic identification data with data entry means, comparing entered basic identification data and stored basic identification data with data comparision means, displaying on display means a randomly selected prompter word associated with a user preliminarily identified on the basis of basic identification data, entering by a user a user response word with manual data entry means, and comparing the stored response word and the user entered response word with comparing means, and obtaining a positive identification of the user with a match of user entered and stored response words.

4. The method of claim 3 further comprising generating continuous time and date data with clock means, and controlling the random selection of prompter words as a function of the clock means.

5. The method of claim 3 wherein the step of forming word-pairs comprises, displaying a plurality of prompter words on a computer video display, entering a predetermined number of prompter words, entering user generated specific response words thereby forming user specific word-pairs, testing user memory of entered response words in response to prompter words, and selecting word-pairs of selected prompter words and user generated response words and transferring the selected word pairs to the data file means.

* * * * *